United States Patent
Keefe et al.

(10) Patent No.: US 9,205,593 B2
(45) Date of Patent: *Dec. 8, 2015

(54) SURFACE TEXTURING USING FOLDABLE STRUCTURES AND ACTIVE MATERIAL ACTUATION

(75) Inventors: Andrew C. Keefe, Encino, CA (US); Guillermo A. Herrera, Winnetka, CA (US); Geoffrey P. McKnight, Los Angeles, CA (US); Christopher P. Henry, Thousand Oaks, CA (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 613 days.

This patent is subject to a terminal disclaimer.

(21) Appl. No.: 13/348,653

(22) Filed: Jan. 12, 2012

(65) Prior Publication Data

US 2012/0114778 A1 May 10, 2012

Related U.S. Application Data

(63) Continuation-in-part of application No. 12/761,709, filed on Apr. 16, 2010, now abandoned.

(51) Int. Cl.
  *B32B 3/24* (2006.01)
  *B29C 59/02* (2006.01)
  *B29C 59/18* (2006.01)
  *B44C 1/00* (2006.01)

(52) U.S. Cl.
  CPC ............... *B29C 59/02* (2013.01); *B29C 59/18* (2013.01); *B44C 1/00* (2013.01); *Y10T 428/24446* (2015.01)

(58) Field of Classification Search
  CPC .................. B29C 59/007; Y10T 428/24446
  USPC ........................................... 428/152
  See application file for complete search history.

(56) References Cited

U.S. PATENT DOCUMENTS

| | | |
|---|---|---|
| 4,555,434 A | 11/1985 | Kunert |
| 4,756,603 A | 7/1988 | Ohtani |
| 5,018,832 A | 5/1991 | Terunuma et al. |
| 5,316,359 A | 5/1994 | Lansinger et al. |
| 6,299,231 B1 | 10/2001 | Reitz |
| 7,370,894 B2 | 5/2008 | Browne et al. |
| 2010/0116430 A1* | 5/2010 | Yang et al. ............. 156/275.7 |
| 2010/0234947 A1* | 9/2010 | Ben Rubi et al. ........ 623/11.11 |

* cited by examiner

*Primary Examiner* — William P Watkins, III

(57) ABSTRACT

Active texturing systems adapted for selectively and reversibly modifying the texture of a surface utilizing a variably foldable structure in communication with the surface, and active material actuation to enable and/or cause folding.

17 Claims, 4 Drawing Sheets

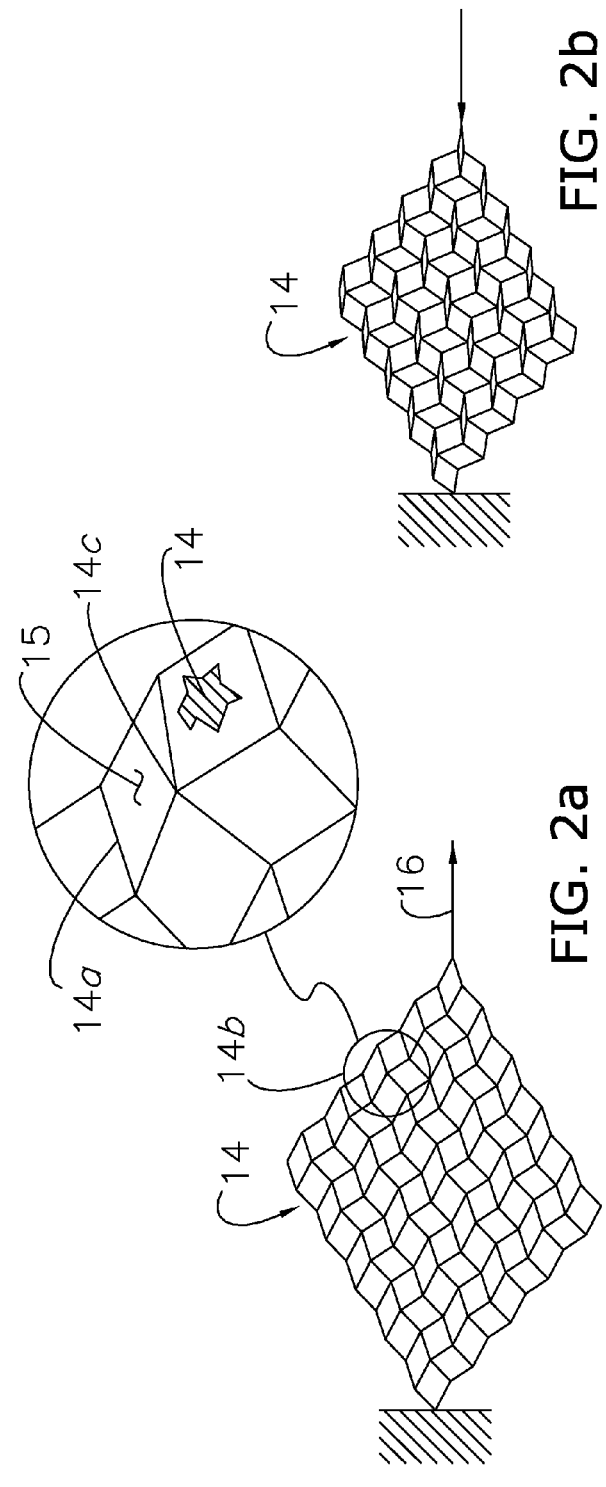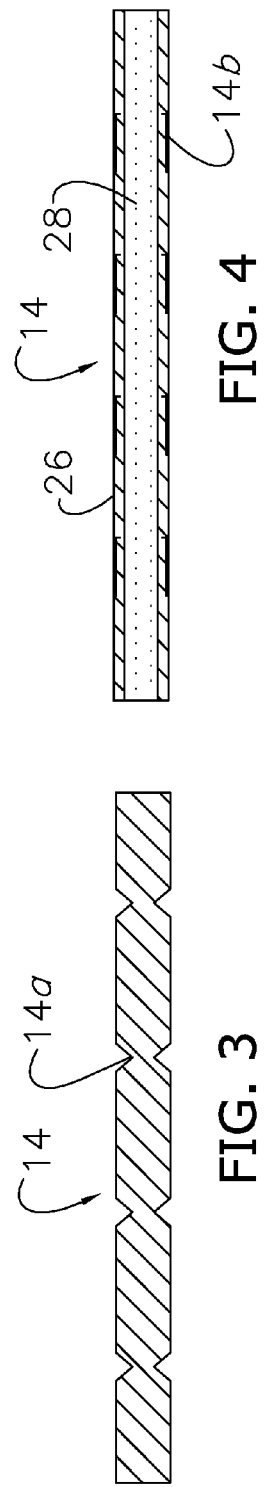

US 9,205,593 B2

SURFACE TEXTURING USING FOLDABLE STRUCTURES AND ACTIVE MATERIAL ACTUATION

CROSS REFERENCE TO RELATED APPLICATIONS

The present application claims priority to and continues in part from U.S. application Ser. No. 12/761,709 entitled "ASSEMBLY FOR AND METHOD OF FORMING LOCALIZED SURFACE WRINKLES" and filed on Apr. 16, 2010, the entire scope of which is hereby incorporated by reference.

BACKGROUND OF THE INVENTION

1. Field of the Invention

The present disclosure generally relates to systems for and methods of surface texturing. More particularly, the invention pertains to a system for and method of actively modifying a surface texture using active material actuation, and foldable structures.

2. Discussion of Prior Art

Surface texturing has long been used to affect, enable, or control various physical interaction (i.e., aspects, or conditions) of a system, including surface adhesion, reflection, coefficients of friction, structural colors, and metrology. Traditionally, once molded, machined, constructed, or otherwise produced, physical systems often present set surface textures that may be advantageous in one or more of the afore-mentioned aspects while presenting disadvantages in others. As a result, active texturing systems have been developed that enable a surface texture to be modified when desired. Conventional active systems, including various combinations of rigid structures and elastic structures having stored therein sufficient energy to buckle the structure, have been inefficient, overly complex, and in some cases limited in capability and extent. By employing conventional electro-mechanical actuation, the various limitations associated therewith (added weight, complexity, part count, etc.) also present concerns.

BRIEF SUMMARY OF THE INVENTION

In response to the afore-mentioned concerns, the present invention recites a more efficient system for and method of actively modifying the texture of a surface, and more specifically, to a system for and method of modifying surface texture utilizing active material actuation and a foldable structure. As a result, the invention is useful for modifying the physical interactions of the system that are affected, enabled, or controlled by surface texture. More particularly, the present invention is useful for modifying, among other physical interactions, the reflective, thermal, fluidic, electro-magnetic, tactile, acoustic, emissive, or aesthetic aspects/capabilities thereof. In a preferred embodiment, the invention is useful for modifying the aesthetics or feel of a surface, so as to effect a visual or haptic alert. Finally, by employing a foldable structure and active material actuation, the invention presents a less complex surface texturing solution that reduces the number of moving parts, packaging requirements, and amount of noise (both with respect to acoustic and EMF) produced.

In general, the invention presents a system for selectively and dynamically modifying the texture of an exposed surface. The system includes a foldable structure that is communicatively coupled to or defines the surface. That is to say, the structure 14 defines a plurality of folds, in the manner, for example, of origami folding. Each fold further defines a degree of folding, and presents an outermost edge or vertex. The system includes at least one active material element operable to undergo a reversible change in fundamental property when exposed to or occluded from an activation signal. The active material element is communicatively coupled to the structure, such that the change causes or enables the degrees of folding, and as a result, the texture of the surface to modify. Where actively actuated, a power supply, controller, and sensor are preferably in communication with the foldable structure and configured to selectively modify the texture of the exposed surface.

The disclosure, including references to vehicular applications, as well as exemplary folding structures and active material elements/actuators may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures of exemplary scale, wherein:

FIG. 2a is an elevation of an actively controlled texturing system including a foldable structure in a flattened condition caused by a singular force input, in accordance with a preferred embodiment of the invention;

FIG. 2b is an elevation of the system shown in FIG. 2a, wherein the input has been ceased and the structure is in a more folded condition;

FIG. 3 is a partial cross-section of an exemplary foldable structure, having a plurality of fold lines etched/formed therein, in accordance with a preferred embodiment of the invention;

FIG. 4 is a partial cross-section of an exemplary foldable structure, having metallic outer layers and polymeric core, in accordance with a preferred embodiment of the invention;

DETAILED DESCRIPTION OF THE INVENTION

Figure 1:
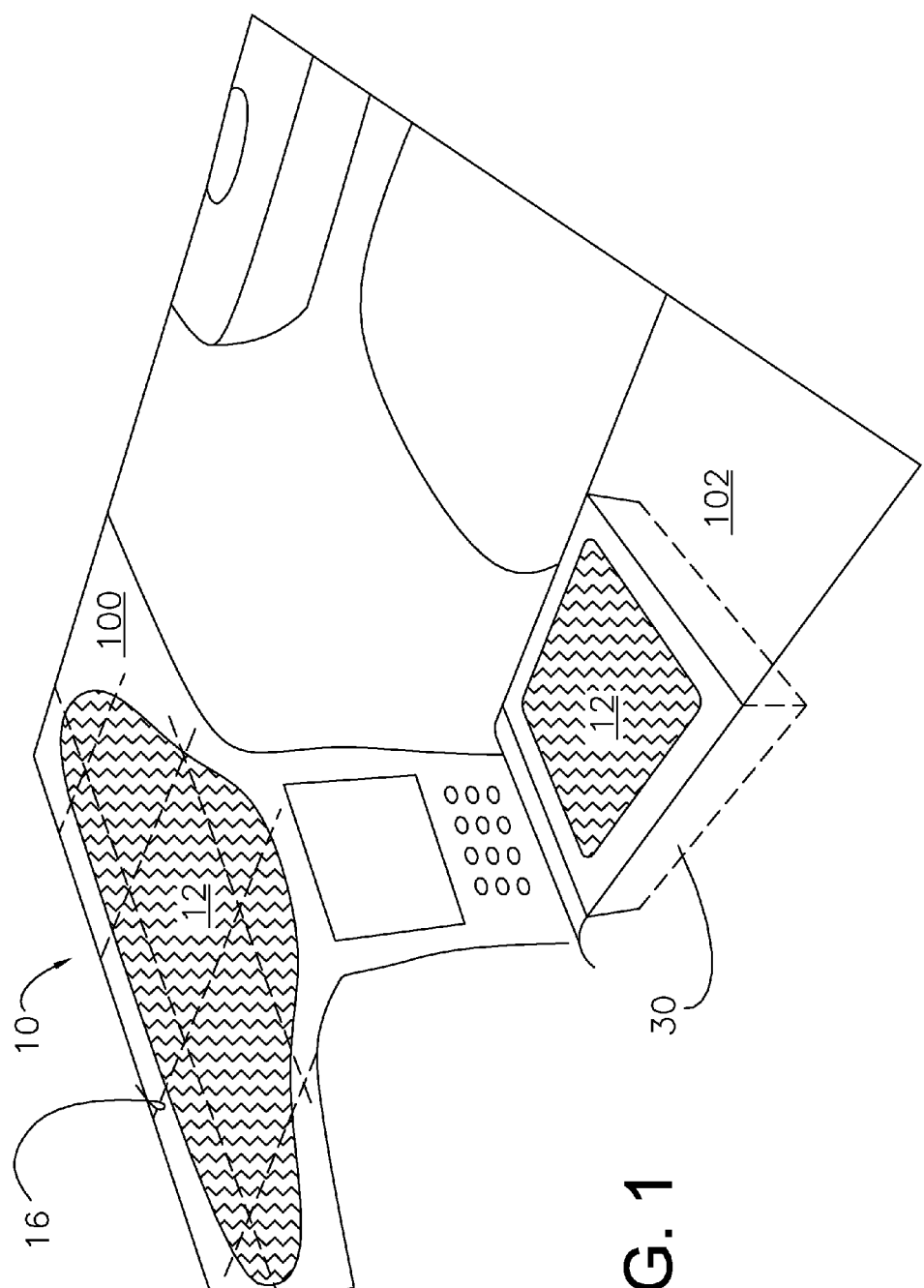
FIG. 1 is a perspective view of the interior cabin of a vehicle, particularly illustrating a controlled texturing system including actively controlled textured surfaces composing the dashboard, and center console, and a shape memory wire mesh drivenly coupled to the dashboard surface, in accordance with a preferred embodiment of the invention.
Figure 5:
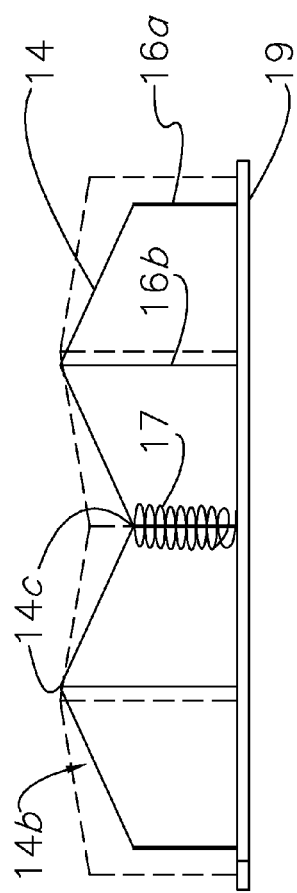
FIG. 5 is a partial elevation of an actively controlled texturing system, including a foldable structure and a plurality of actuators orthogonally engaging the structure, in accordance with a preferred embodiment of the invention.

The following description of the preferred embodiments is merely exemplary in nature and is not intended to limit the invention, its application, or uses. As described and illustrated herein, a novel system 10 for and method of selectively and reversibly modifying the texture of a surface 12 utilizing a variably foldable structure 14 and active material actuation is presented herein (FIGS. 1-10). The inventive system 10 may be used to effect an intended condition, or modify a physical interaction, characteristic, or phenomenon of the surface 12 over a wide range of applications. In FIG. 1, for example, the system 10 is shown in an automotive setting, wherein the texture of the dashboard 100 has been modified to reduce veiling glare and the texture of the center console 102 has been modified to reduce the contact surface area of engagement with a hot surface. In other applications, it is appreciated that modification of surface texture may be used to mitigate acoustic noise, or change specularity without affecting the reflectivity of the base material. In yet another application, it is appreciated that modifying external body surface textures may be used to reduce wind drag and/or produce radar scatter in automotive and aeronautical applications. Plural embodiments and examples of the system 10 are further described below.

I. Active Material Description and Discussion

As used herein the term "active material" is defined as any material or composite that exhibits a reversible change in fundamental (i.e., chemical or intrinsic physical) property when exposed to or occluded from an activation signal. In the present invention, active materials may be used to effect reconfiguration of the foldable structure 14, and may compose an actuator 16, and/or the structure 14 itself.

Suitable active materials for use with the present invention include but are not limited to shape memory materials that have the ability to remember at least one attribute such as shape, and this attribute can subsequently be recalled by applying an external stimulus. Exemplary shape memory materials include shape memory alloys (SMA), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers/ceramics, and high-volume paraffin wax. Among these, SMA's and EAP's in appropriate geometric form are particularly suited for use as actuators 16 herein, and, as such, are further described bellow.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensite phase and are harder, stiffer, and/or more rigid in the Austenite phase. In view of the foregoing, a suitable activation signal for use with shape memory alloys is a thermal activation signal having a magnitude sufficient to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

Intrinsic and extrinsic two-way shape memory materials are characterized by a shape transition both upon heating from the Martensite phase to the Austenite phase, as well as an additional shape transition upon cooling from the Austenite phase back to the Martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the Martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of approximately 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. Joule heating can be used to make the entire system electronically controllable. Stress induced phase changes in SMA are, however, two-way by nature. Application of sufficient stress when an SMA is in its Austenite phase will cause it to change to its lower modulus Martensite phase in which it can exhibit up to 8% of "superelastic" deformation. Removal of the applied stress will cause the SMA to switch back to its Austenite phase in so doing recovering its starting shape and higher modulus.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response.

Electroactive polymers include those polymeric materials that exhibit piezoelectric, pyroelectric, or electrostrictive properties in response to electrical or mechanical fields. An example is an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, and polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Moreover, a suitable active material for use is forming the structure 14 is shape memory polymer, so as to provide selective softening and hardening of the folded features therein. Shape memory polymers (SMP's) generally refer to a group of polymeric materials that demonstrate the ability to return to a previously defined shape when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material above the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, urethane block copolymers, styrene-butadiene-styrene block copolymers, and the like.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

II. Exemplary Texturing Systems and Methods of Use

As previously mentioned, the system 10 generally includes a foldable structure 14 in communication with (i.e., defines, or is in direct or indirect physical engagement therewith) the surface 12. For example, the structure 14 may be a thin planar sheet having been trained to undergo origami folding when laterally compressed. As best shown in FIGS. 2a,b, the structure 14 presents a plurality of folds 14a that define a variable degree of folding; the present invention functions to modify the degree of folding offered by the folds 14a, so as to re-texture the surface 12. It is generally preferred that the act of folding the structure 14 and the spring modulus of the sheet creates a return bias upon the surface 12 in the more folded condition. The continuity and pattern of the structure 14 enables the folded surface 12 to deform uniformly over large areas with minimal input actuation. Finally, it is appreciated that the foldable structure 14 may be laminated or coated with colored or otherwise textured media to create a more complex surface 12.

More particularly, in FIGS. 2a,b, an exemplary structure 14 is shown presenting a plurality of herringbone-like facets 14b. Adjacent facets 14b are defined by a plurality of shared folding edges that cooperate to further define upper and lower vertices 14c. It is the dynamic control of the vertices 14c that primarily defines the surface texture, or manipulates a flexible overlay (e.g., thermally insulating, or otherwise protective film, skin, etc.) 15 to influence the surface texture. Where the structure 14 is configured to undergo origami folding, complex surfaces 12 are induced and modulated in a controllable and space-saving manner. For example, the structure 14 may present a square Miura fold pattern, wherein the pitch and amplitude of the facets 14b can be increased (FIG. 2b) or decreased (FIG. 2a) uniformly and reversibly. This deformation may be in one or more directions simultaneously, depending upon the geometry of the folded surface 12.

In a preferred method of construction, the structure 14 is formed of steel or aluminum sheet stock, and the pattern is produced by etching fold lines on both faces of the sheet (FIG. 3). More preferably, mechanical deformation of the folds 14a causes the sheet (i.e., structure 14 in this example) to behave in a spring-like manner due to strain hardening. If high strength metallic alloys are used and it is desired to remain within elastic regime over a folding angle of 15-30 degrees, the minimum folding line is preferably between 0.015-0.030 inches (i.e., 0.038-0.076 cm) corresponding to a minimum facet size (such that a facet is greater than thrice the fold line dimensions) of between 0.05-0.08 inches (i.e., 0.13-0.20 cm). Alternatively, folding can be accomplished in a self-organized fashion by producing within the sheet thinned areas along the intended fold lines on opposite sides of the sheet. This can be accomplished, for example, by photolithography, wet etching, stamping, or pressing features into the sheet. For simultaneous forming and folding operations stamping or pressing may be used.

It is appreciated that polymeric materials may also be employed to effect a greater variety of surface contours. Polymeric structures 14 are better suited to actuation at more than one point, thereby creating more complex (e.g., non-uniform)

modifications of texture, and offer a broader range of facet sizes and aspect ratios, making them useful across a broader spectrum of wavelengths ($\lambda$), including but not limited to visible light and radar frequencies. Moreover, for electromagnetic-based applications (such as antennas), the continuous electrical conductivity of some polymeric structures offer further benefit. A polymeric structure 14 may have fiber reinforcements in one or more orientations and present woven and non-woven patterns for added stretch-ability and structural integrity.

Another embodiment shown in FIG. 4 comprises a laminated metal-polymer-metal structure 14 wherein the surface facets 14b are chemical etched within metallic outer layers 26 adhered to a central polymeric core 28. In this configuration, it is appreciated that bending strain may be taken-up by the compliant polymeric layer.

In a preferred embodiment, the system 10 includes an active material actuator 16 that is drivenly coupled to and operable to reconfigure the structure 14. For example, a shape memory alloy wire 16 may be drivenly coupled to one or more lateral corners or edges of the structure 14, and externally disposed, as shown in FIGS. 2a,b. Alternatively, and as shown in FIG. 1, the wire 16 may traverse the span of the surface 12. Here, it is appreciated that the structure 14 may present one or more distending flaps (not shown) at its perimeter to accommodate attachment to and linear action by the wire 16; moreover, the wire 16 may be entrained by a plurality of holes defined at a linear set of bottom vertices in the folded condition. More preferably, a plurality of wires 16 may intercept each other as they cross the span, so as to present a mesh or grid (also shown in FIG. 1). Through activation of the active material actuator 16 the structure 14 is reconfigured, such that facets 14b are caused to decrease (or increase) in slope; and by changing the slopes, the surface texture is modified. The texture may then be reversed, making a preferred system 10 one that is sufficiently elastic and durable to remain reversible over the desired number of cycles.

In another embodiment, a plurality of actuators 16 are configured to engage each vertex in a traverse, and more preferably, orthogonal manner (FIG. 5), so as to effect a desired wavelength ($\lambda$), similar to a bed of pins. The actuators 16 are formed of a contractile active material, such as shape memory alloy, and may be a combination of active and passively activated actuators 16a, b, wherein the passive actuators 16b are connected to the top vertices, and the active actuators 16a are connected to the bottom vertices. As the active actuators 16a are actuated, the bottom vertices are pulled down, while the passive actuators 16b maintain the top vertices at a fixed height, such that the slopes of the facets 14b are increased most efficiently. Moreover, this creates a surface 12 that changes in texture but remains flush with surrounding surfaces. Thus, it is appreciated that the actuators 16a, b are able to relatively translate, and are therefore embedded within an elastic base 17 or entrained corresponding to the folding pattern. Again, the stored energy in the overall system 10, including the base, may provide a restoring force. More preferably, wherein each actuator 16 presents an SMA wire, a return mechanism 19, such as a compression spring coaxially aligned therewith (FIG. 5), is included to present a bias force towards return.

Alternatively, contractile dielectric elastomers, magnetostrictives, electrostrictives, piezoelectric composites, or EAP actuators 16, as well as expansive materials, such as high-volume paraffin wax actuators 16 constrained to act linearly may be used in lieu of SMA. The contractile actuators 16 may be made in a scalable fashion as continuous or perforated sheets that are stacked to provide the appropriate response magnitude. Finally, where a plurality of actuators 16 are individually activated it is appreciated that more localized, dynamic, and variable stroke modifications can be achieved.

Figure 6:
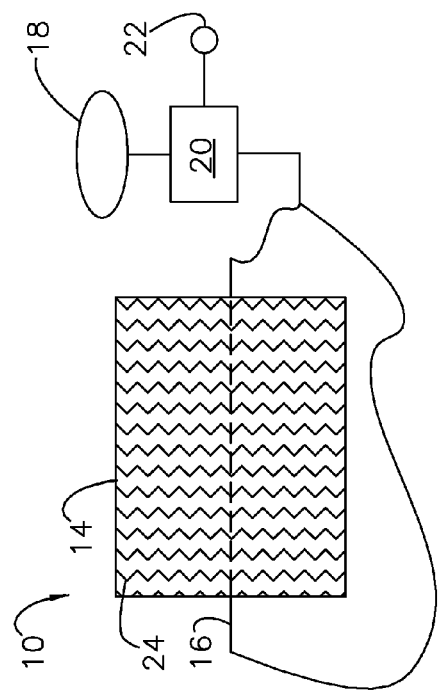
FIG. 6 is a plan view of an actively controlled texturing system including a shape memory polymer structure, having a plurality of heating elements off-centered therein, a contractile wire actuator, a sensor, a power supply, and a controller communicatively coupled to the actuator, sensor, and supply, in accordance with a preferred embodiment of the invention.

Thus, as shown in FIG. 6, the preferred system 10 further includes a power supply 18 communicatively coupled to the actuator 16, and operable to generate a sufficient activation signal on-demand. In an automotive application, for example, the power supply 18 may include the charging system of the vehicle (not shown). Moreover, an electronic controller 20 may be employed intermediate the supply 18 and actuator 16, and programmably equipped to control actuation. That is to say, the timing, duration, and magnitude of a surface texturing event may be controlled by manipulating the signal accordingly. Lastly, a sensor 22 may be used to provide information (e.g., notice of a triggering event, such as the detection of a radar beam, sunlight, or surpassing of a threshold temperature or speed) to the controller 20. In this configuration, the system 10 is operable to provide autonomous texturing, in addition to or in lieu of on-demand texturing, when the controller 20 receives the information. For example, a thermometer 22 may be employed to effect active texturing of a steering wheel surface (not shown) or center console 102 (FIG. 1), only when the interior cabin temperature reaches a threshold temperature; or, a photoelectric sensor 22 may be used to actively modify the texture of a dashboard 100 during daylight hours to reduce veiling glare. Similar automation with respect to wind drag and exterior surface texture may also be achieved when the speedometer 22 reaches a threshold speed.

In a preferred embodiment, the structure 14 and active material element 16 are integrated. For example, the structure 14 may be formed of a shape memory polymer that would enable selective softening of and memorized return to the folded condition by the structure 14. This would allow retention of the deformation without external force (i.e., zero-power hold). That is to say, the rigidity of the structure 14 can be increased, and/or the force necessary to deform the surface 12 reduced. In general, the SMP would be molded into the folding pattern and more folded condition in its deactivated state, then flattened by receiving a sufficient force vector input after activation, and then locked into the flattened condition by deactivating the SMP while retaining the input. To return the structure 14 to the more folded condition, the SMP is again activated without the input.

Where shape memory polymer is employed, the structure 14 preferably includes embedded heating elements (e.g., wires or patches) 24 which create localized heating and transformation (FIG. 6). Localized soft and hard regions may be used to define a variable folding pattern on the surface 12 that can be changed by energizing specific combinations of heating elements 24 and/or actuators 16. Thus, preferential fold lines for greater variability in texture control may be provided. FIG. 6 shows a dual embodiment, wherein the structure is formed of SMP to effect selective softening/locking, and influencing of the folding pattern (together with etching, stamping, etc.), and a contractile wire 16 traverses the structure 14, so as to effect selective folding.

In another example, the structure 14 may comprise a shape memory alloy (SMA) sheet trained to memorize the more folded condition. Here, the structure 14 may be in a normally low modulus Martensite phase, such that a low energy input causes it to flatten. When the more folded condition (FIG. 2b) is desired, the structure 14 is heated above its transformation temperature after the input has been removed, to recover its memorized shape. Alternatively, where the structure 14 is in the normally Austenite phase, it is appreciated that a stress load input of sufficient magnitude may be applied to cause the Austenite to Martensite phase transformation prior to flattening. Upon release of the stress load, the structure 14 reverts back to the Austenite phase and memorized shape. Finally, it is appreciated that a combination of the foregoing examples may be employed, wherein SMA forms the outer layers 26 and SMP forms the polymeric core 28.

In another embodiment, the folded structure 14 is adhered to a compliant substrate 30 through which actuation may be realized (FIG. 7-10). That is to say, the substrate 30 may be configured such that deforming it modifies the degree of folding within the structure 14. The structure 14 is preferably adhered to the substrate 30 using a flexible adhesive. Preferably, the substrate 30 has a lower elastic modulus than the pre-patterned structure 14. As such, the substrate 30 preferably provides a restoring force when deformed, and may be pre-strained. Depending on the pattern involved, the substrate 30 may be uni-axially or bi-axially pre-strained. Upon releasing the pre-strain (or decreasing monotonically) the compressive strain energy built up in the higher stiffness surface sheet 14 is relieved via the organized folding mode. To improve the folding characteristics several steps may be taken including slightly pre-biasing the deformations of the fold lines, incorporation of through holes at the vertices 14c, and careful selection of the structure, adhesive and substrate materials. In some instances the substrate 30 may have adhesive properties, eliminating the need for a separate adhesive. For assisted folding, it is appreciated that progressive jigs and tools may be employed.

Figure 7:
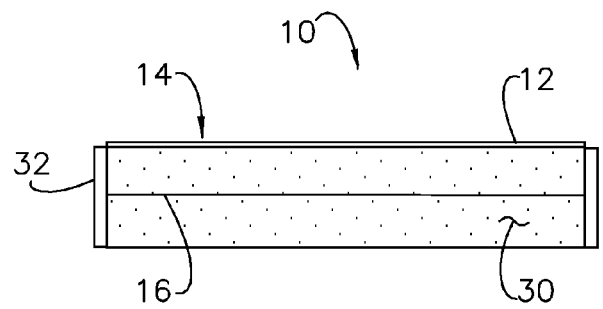
FIG. 7 is a cross-section of an actively controlled texturing system including a foldable structure defining a flat pre-activation surface, a substrate adhered to the structure, and a shape memory wire actuator embedded within the substrate fixedly secured to end caps oppositely engaging the substrate, in accordance with a preferred embodiment of the invention.

In this configuration, the preferred actuator 16 is drivenly coupled to the substrate 30, and more preferably, through opposite end caps 32. The end caps 32 coextend with a lateral edge of the substrate 30 (FIGS. 7-9), so that the actuating force is transferred evenly. The end caps 32 are fixedly secured relative to the substrate 30 and may be anchored therein via over-molded engaging prongs (not shown). In a first example, the actuator 16 includes at least one, and more preferably a plurality of shape memory wires/tendons formed for example of SMA, EAP, etc. that are embedded within, so as to traverse the full width of the substrate 30 (FIG. 7). More preferably, a single wire 16 is entrained by the end caps 32 to form multiple loops along the length of the substrate 30. Here, the wire 16, when activated, promotes uniform translation, thereby causing the caps 32 to travel towards each other without eccentricity. Where a thermally activated actuator 16 is used, it is appreciated that the substrate 30 is able to withstand the anticipated number of heating-cooling cycles without degradation. To that end, a barrier (not shown), such as a thermally insulating sleeve, may be used to envelope the wire 16 and protect the substrate 30.

Figure 8:
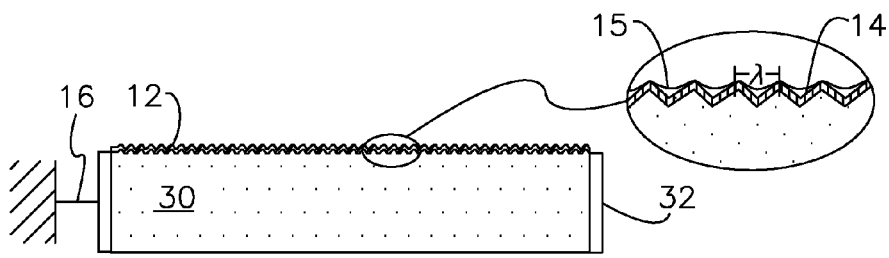
FIG. 8 is a cross-section of an actively controlled texturing system including a foldable structure defining surface facets, a substrate adhered to the structure, a shape memory wire actuator external to the substrate, and end caps oppositely engaging the substrate, in accordance with a preferred embodiment of the invention.

In another example, the actuator 16 is externally coupled to, and configured to retentively displace at least one cap 32 (FIG. 8). An SMA wire 16, for example, may be employed to pull a cap 32 and stretch the substrate 30, wherein the wire 16 is lengthened/redirected through at least one pulley (not shown) as necessary. To increase the amplitude and reduce wavelength (i.e., compress the structure 14) a piezoelectric stack sandwiched between an end cap 32 and fixed structure may be caused to expand when activated; or an arcuate SMA or EAP element 16 (FIG. 10) that straightens when activated may be used to compress the substrate 30. Finally, an SMP or SMA spring (not shown) able to modify its spring constant through activation may be employed, wherein only the stiffer constant is able to overcome the compressive strength of the substrate 30.

Figure 9:
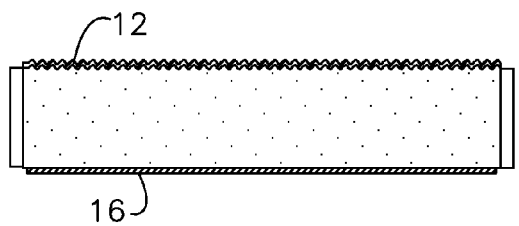
FIG. 9 is a cross-section of an actively controlled texturing system including a foldable structure defining surface facets, a substrate adhered to the structure, and an active material sheet disposed beneath the substrate, in accordance with a preferred embodiment of the invention.

In another embodiment, the actuator 16 may consist of an active material sheet (or disk) disposed beneath the substrate 30 (FIG. 9). The planar sheet 16, for example, may be formed of SMA, so as to be operable to contract laterally in all directions. In this configuration, it is appreciated that activating the sheet 16 approximately results in a sixteen percent reduction in surface area where maximum recoverable Martensitic strain is provided. It is also appreciated that the actuator 16, and bottom of the substrate 30 are free to allow for an increase in system depth, again, so that the surface 12 changes in texture but otherwise remains flush with surrounding surfaces. The same is true for a substrate 30 consisting of negative Poisson's ratio material.

Figure 10:
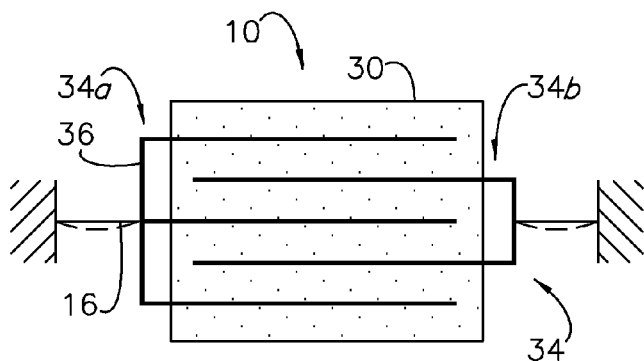
FIG. 10 is a partial plan view of an actively controlled texturing system including a substrate, overlapping rigid members embedded therein, and shape memory arcuate actuators drivenly coupled to the members, in accordance with a preferred embodiment of the invention.

In yet another example, the system 10 includes a rigid member 34 embedded in the substrate 30 and drivenly coupled to the actuator 16 (FIG. 10). In the illustrated embodiment, the rigid member 34 is divided into two or more parts 34a,b that move in opposite directions to compress/stretch the substrate 30. That is to say, the member 34 may be used to rectify actuation and modulate the texture, as a transmission. More particularly, an active material actuator 16, such as the arcuate actuator shown in FIG. 10, may be attached to a cross-bar 36 comprising a driven one of the parts 34a,b, to provide a push force thereto. The preferred rigid member 34 is inter-digitated as shown; and the overlapping length, L, of the parts 34a,b may be prescribed for a desired compression/stretching. More preferably, the parts 34a,b are relatively repositionable, and length, L, is adjustable, so as to tune the service life of the member 30 and/or adjust the modification of the surface texture.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A system for selectively modifying the texture of an exposed surface, said system comprising:
   a foldable structure having two opposed faces, one of the two opposed faces defining the exposed surface, the foldable structure having a square Miura fold pattern, including:
      a plurality of facets; and
      shared folding edges etched into both of the two opposed faces, a respective shared folding edge in one of the two opposed faces positioned directly opposite to an other respective shared folding edge in an other of the two opposed faces, each of the shared folding edges defined by respective adjacent facets, and the shared folding edges cooperating to define upper and lower vertices; and
   at least one active material actuator operable to undergo a reversible change in fundamental property when exposed to or occluded from an activation signal, the at least one actuator drivenly coupled to the foldable structure to cause a pitch and an amplitude of the plurality of facets to increase or decrease in response to the activation signal.

2. The system as claimed in claim 1, further comprising a plurality of active material actuators in a form of a grid wherein at least some of the plurality of actuators intercept at least some other of the plurality of actuators across the foldable structure.

3. The system as claimed in claim 1, wherein the exposed surface is defined in a vehicle, and modifying the texture alters wind drag, radar scatter, veiling glare, or contact surface area.

4. The system as claimed in claim 1, further comprising:
a controller communicatively coupled to the at least one actuator, and operable to selectively generate, and terminate the activation signal; and
a sensor communicatively coupled to the controller and operable to determine and convey information to the controller;
said at least one actuator, controller, and sensor being cooperatively configured to modify the texture only when information is received by the controller from the sensor.

5. The system as claimed in claim 1, wherein the foldable structure includes metallic outer layers adhered to opposed surfaces of a central polymeric core, and wherein the plurality of facets are surface facets etched within each of the metallic outer layers.

6. The system as claimed in claim 1, wherein the foldable structure is formed of shape memory polymer.

7. The system as claimed in claim 6, wherein the foldable structure further includes a plurality of interiorly disposed heating elements, wherein the plurality of interiorly disposed heating elements includes wires or patches that are operatively connected to the at least one actuator that traverses the foldable structure.

8. The system as claimed in claim 1, wherein the at least one actuator is selected from the group consisting of a shape memory alloy, a shape memory polymer, piezoelectric composites, a magnetostrictive material, an electrostrictive material, a dielectric elastomer, and an electroactive polymer.

9. The system as claimed in claim 1, further comprising a plurality of active material actuators wherein:
at least a portion of the plurality of actuators are passively actuated and are respectively connected to the upper vertices; and
at least an other portion of the plurality of actuators are actively actuated and are respectively connected to the lower vertices.

10. The system as claimed in claim 1, wherein the at least one actuator includes a sheet disposed beneath a substrate upon which the foldable structure is positioned.

11. The system as claimed in claim 1, further comprising:
a substrate, wherein the folded structure is adhered to the substrate; and
first and second opposite end caps fixedly secured to and adjacent the substrate;
said at least one actuator being drivenly coupled to at least one of the first and second opposite end caps.

12. The system as claimed in claim 1, further comprising:
an elastic substrate fixedly adhered to the foldable structure.

13. The system as claimed in claim 12, wherein the actuator is embedded within and traverses the substrate, and configured to stretch or compress the substrate.

14. The system as claimed in claim 9, wherein the foldable structure is shiftable between flattened and folded conditions, and the activation signal causes the plurality of actively actuated actuators to shift the foldable structure to the folded condition, and wherein the system further comprises:
a return mechanism drivenly coupled to the foldable structure antagonistic to the plurality of actuators, and operable to reverse the plurality of actively actuated actuators and cause the foldable structure to shift to the flattened condition.

15. The system as claimed in claim 14, wherein the return mechanism is a compression spring respectively and coaxially aligned with each of the plurality of actuators.

16. The system as claimed in claim 1, wherein the foldable structure is formed of a material selected from the group consisting of steel and aluminum.

17. A system for selectively modifying the texture of an exposed surface, said system comprising:
a shape memory alloy foldable structure defining the exposed surface, the shape memory alloy foldable structure having a square Miura fold pattern as its memorized shape, the square Miura fold pattern including:
a plurality of facets; and
shared folding edges defined by adjacent facets, the shared folding edges cooperating to define upper and lower vertices; and
heating elements embedded in the shape memory alloy foldable structure which, when activated, create localized heating of the shape memory alloy foldable structure and transformation of the shape memory alloy foldable structure to the memorized shape.

* * * * *